US010153904B2

(12) United States Patent
Roper (10) Patent No.: US 10,153,904 B2
(45) Date of Patent: Dec. 11, 2018

(54) VALIDATING RESOURCES EXECUTION

(71) Applicant: NCR Corporation, Duluth, GA (US)

(72) Inventor: Anthony Edward Roper, Dundee (GB)

(73) Assignee: NCR Corporation, Atlanta, GA (US)

( * ) Notice: Subject to any disclaimer, the term of this patent is extended or adjusted under 35 U.S.C. 154(b) by 68 days.

(21) Appl. No.: 14/699,345

(22) Filed: Apr. 29, 2015

(65) Prior Publication Data

US 2016/0323106 A1 Nov. 3, 2016

(51) Int. Cl.
| | | |
|---|---|---|
| *H04L 9/32* | (2006.01) | |
| *G06F 21/51* | (2013.01) | |
| *H04L 29/06* | (2006.01) | |
| *G06Q 20/18* | (2012.01) | |
| *G06F 21/57* | (2013.01) | |
| *G07F 19/00* | (2006.01) | |

(52) U.S. Cl.
CPC ............ *H04L 9/3247* (2013.01); *G06F 21/51* (2013.01); *G06F 21/57* (2013.01); *G06Q 20/18* (2013.01); *G07F 19/206* (2013.01); *H04L 63/0442* (2013.01); *H04L 63/101* (2013.01); *H04L 63/126* (2013.01); *G06Q 2220/00* (2013.01)

(58) Field of Classification Search
CPC ..... H04L 19/3247; H04L 63/101; G06F 8/65; G06F 21/51; G06F 21/52; G06Q 20/18; G06Q 20/3827
USPC ......................................................... 713/176
See application file for complete search history.

(56) References Cited

U.S. PATENT DOCUMENTS

| | | | | |
|---|---|---|---|---|
| 5,787,403 | A * | 7/1998 | Randle ................... | G06Q 20/00 235/380 |
| 6,085,177 | A * | 7/2000 | Semple ............... | G06F 17/3087 235/379 |
| 6,115,816 | A * | 9/2000 | Davis ..................... | G06F 21/72 380/255 |
| 6,308,887 | B1 * | 10/2001 | Korman ................. | G06Q 20/18 235/379 |
| 6,396,928 | B1 * | 5/2002 | Zheng ................... | H04L 9/3247 380/283 |
| 6,539,361 | B1 * | 3/2003 | Richards ................. | G06F 3/023 705/35 |
| 6,705,517 | B1 * | 3/2004 | Zajkowski ............. | G06F 3/023 235/379 |
| 8,549,626 | B1 | 10/2013 | Glick | |
| 2011/0087692 | A1 * | 4/2011 | Masone .................... | G06F 8/60 707/769 |
| 2011/0103581 | A1 * | 5/2011 | Yoon ..................... | H04L 9/0861 380/44 |
| 2013/0097660 | A1 * | 4/2013 | Das ......................... | H04L 63/10 726/1 |

(Continued)

*Primary Examiner* — Kambiz Zand
*Assistant Examiner* — Tongoc Tran
(74) *Attorney, Agent, or Firm* — Schwegman, Lundberg & Woessner (57) ABSTRACT

A whitelist of hash values for applications is signed and encrypted by a remote device and the encrypted whitelist is securely delivered over a network connection to a second device as an encrypted whitelist. The second device decrypts the whitelist and validates the signature of the remote device for the decrypted whitelist. Hash values in the decrypted version of the encrypted whitelist are compared against dynamically computed hash values for the applications. Applications with matching hash values are permitted to execute on the second device.

18 Claims, 4 Drawing Sheets

(56) References Cited

U.S. PATENT DOCUMENTS

| | | | |
|---|---|---|---|
| 2013/0283377 A1* | 10/2013 | Das | G06F 21/51 |
| | | | 726/23 |
| 2014/0068593 A1* | 3/2014 | McErlane | G06F 8/61 |
| | | | 717/171 |
| 2014/0166744 A1* | 6/2014 | Crews | G06F 21/57 |
| | | | 235/379 |
| 2014/0208090 A1* | 7/2014 | Anson | G06F 9/4401 |
| | | | 713/2 |
| 2014/0359774 A1* | 12/2014 | Pulapaka | G06F 21/50 |
| | | | 726/24 |
| 2015/0074384 A1* | 3/2015 | Yajima | G06F 21/575 |
| | | | 713/2 |
| 2016/0004866 A1* | 1/2016 | Lin | G06F 21/6281 |
| | | | 713/164 |
| 2016/0203313 A1* | 7/2016 | El-Moussa | G06F 8/65 |
| | | | 726/23 |
| 2016/0371472 A1* | 12/2016 | Walsh | H04L 63/102 |
| 2016/0378970 A1* | 12/2016 | Campbell | G06F 21/575 |
| | | | 726/17 |

* cited by examiner

VALIDATING RESOURCES EXECUTION

BACKGROUND

Automated Teller Machines (ATM) are in general believed to be relatively secure devices since the handle consumer financial transactions. However, ATMs are susceptible to malware and viruses just like any other device having memory and processor capabilities.

Moreover, an ATM is very lucrative to any eavesdropper capable of compromising the ATM execution environment. An ATM is not only loaded with currency, but also handles financial account information for consumers. Still further, the ATM has access to a secure financial network that can access many different financial institutions and likely has access to a branch server that interfaces over a separate network connection with the ATM's core banking system. Thus, a compromised ATM could potentially create security issues for many customers and many financial institutions.

Access to the ATM for purposes of compromising its security can come knowingly from ATM maintenance staff (as part of an inside operation to compromise the ATM) or unknowingly from ATM maintenance staff through devices they use to interface with the ATM, where those interface devices are compromised. The threat can also occur remotely from one of the ATM's network connection. Also, the threat may come from a customer that is able to access an ATM interface port without being noticed (or even replace a peripheral device of the ATM by replacing the peripheral device with a compromised one).

In fact, there are a variety of scenarios in which an ATM can be exposed to security vulnerabilities.

Therefore, there is a need to continually validate the authenticity of the software resources of the ATM to ensure that the ATM has not become compromised in some manner.

SUMMARY

In various embodiments, methods and a Self-Service Terminal (SST) for validating execution resources are presented.

According to an embodiment, a method for validating an execution resource is presented. Specifically, a signature of an encrypted file is validated and the encrypted file is decrypted to produce a decrypted file. Next, a first hash value is computed for an application and a second hash value obtained from the decrypted file for the application is obtained and compared against the first hash value. Finally, a decision is made as to whether to permit the application to execute on a device or to prevent the application from executing on the device based on the comparison.

DETAILED DESCRIPTION

Figure 1:
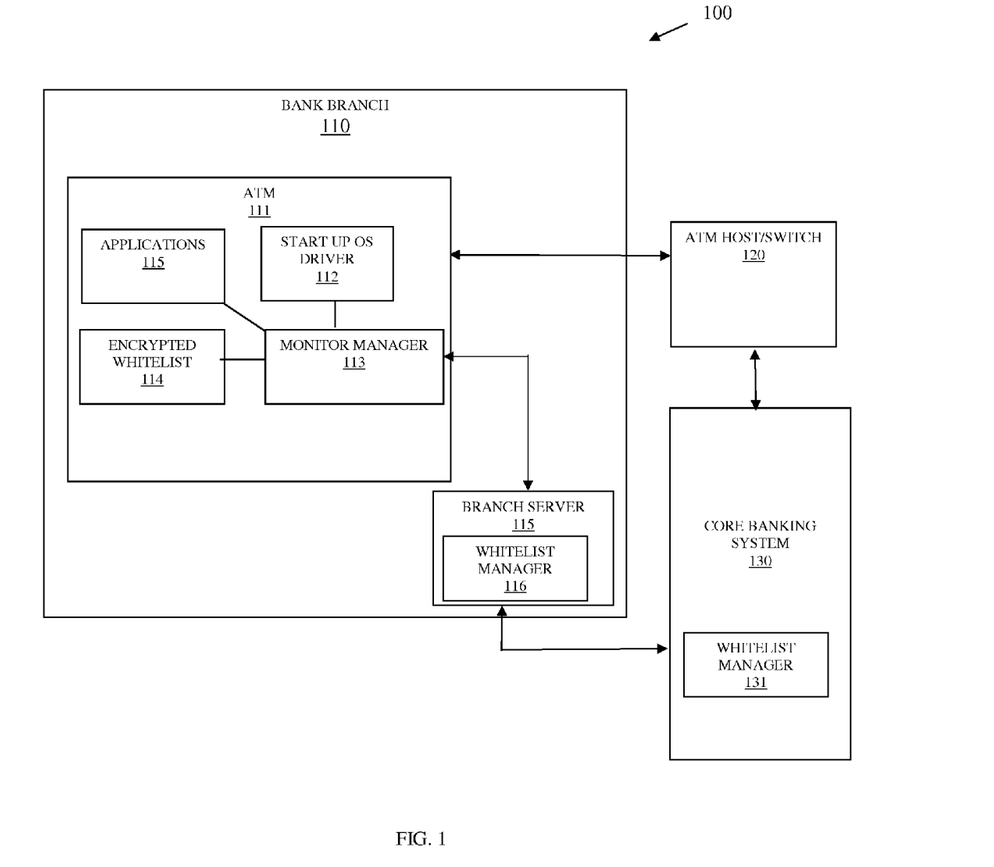
FIG. 1 is a diagram of a banking system for providing validation of resource execution for an Automated Teller Machine (ATM), according to an example embodiment.

FIG. 1 is a diagram of a banking system 100 for providing validating or resource execution for an Automated Teller Machine (ATM), according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of validating resource execution, presented herein and below.

The banking system 100 includes a bank branch 110, an ATM host/switch 120, and a core banking system 130. The bank branch 110 includes an ATM 111 (having a startup Operating System (OS) driver 112, a monitor manager 113, an encrypted whitelist 114 (discussed below), and applications 115 that execute on the ATM 111), a branch server 116 (having a whitelist manager 117). The core banking system 130 includes a whitelist manager 131.

During initial power up or boot of the ATM 111, an existing startup OS driver is enhanced or a new startup OS driver is deployed on the ATM 111 as the startup OS driver 112. The startup OS driver 112 computes a hash value of the monitor manager 113 before the monitor manager 113 is initiated on the ATM. The hash value is checked against a signed hash value stored in an encrypted format on the ATM 111. The signed hash value is signed and encrypted by the whitelist manager 116 of the branch server 115 or the whitelist manager 131 of the core banking system 130. The digital signature is signed using a private key of the branch server 115 or core banking system 130 and the signed hash value is encrypted using a public key of the ATM 111. The ATM 111 can only decrypt the encrypted and signed hash value using the ATM's private key and validate the signature using a public key of the branch server 115 of the core banking system 130. The decrypted and signature validated hash value is compared against the hash value generated by the startup OS driver 112. This ensures that the monitor manager 113 has not been tampered when initiated for processing on the ATM 111 at power up or boot up.

When the decrypted and validated hash value does not match the computed hash value (computed by the startup OS driver 112), then the startup OS driver 112 can take a variety of configured actions, such as: replacing the monitor manager 113 with an original (securely archived version) monitor manager 113 that matches a hash value with the expected hash value; requesting an encrypted version of the monitor manager 113 from the branch server 116 that matches the expected hash value; requesting the branch server 116 obtain the monitor manager 113 that matches the expected hash value from the core banking system 130; refusing to boot the ATM 111 for operation (or aborting a boot of the ATM 111 that is in process); disconnecting the ATM 111 from access to the networks (ATM host/switch 120 and branch server 116 (after sending a notification about the perceived security issue with the monitor manager 113)); and the like.

After the monitor manager 113 is successfully validated by the startup OS driver 112, the monitor manager 113 requests an encrypted whitelist 114 (that is also signed) from the whitelist manager 117 of the branch server (assuming this is the first time that the monitor manager 113 is operating on startup at the ATM 111 otherwise, the encrypted whitelist 114 may already exist on the ATM 111 for processing by the monitor manager 113).

It is noted that the whitelist manager 117 may actually make a request for the encrypted and signed copy of the encrypted whitelist 114 from the whitelist manager 131 of the core banking system 130 in some embodiments where the encrypted whitelist 114 is managed and controlled by the core banking system 130; rather than the branch server 116.

The encrypted whitelist 114 is a signed table that includes an entry for each software resource (applications 115) that executes on the ATM 111. Each entry includes an identifier for an application 115 and a last-received valid hash value for that application 115 (received and produced from the whitelist manager 117 of the branch server 116 and/or received through the branch server 116 from the whitelist manager 131 of the core banking system 130 when the whitelist manager 131 produce and controls distribution of the encrypted whitelist 114).

The whitelist is signed using a private key only held by the branch server 116 or only held by the core banking system 130 and the signed whitelist is encrypted as the encrypted whitelist 114 using a public key of the ATM 111. The monitor manager 113 decrypts (when needed, dynamically, and on an as-needed basis) the encrypted whitelist 114 using a private key of the ATM 111 and the public key of the branch server 116 or the public key of the core banking system 130. Also, the monitor manager 113 validates the signature of the decrypted version of the encrypted whitelist 114 using the public key of the branch server 116 or the core banking system 130. The private key of the ATM 111 never leaves the ATM 111 and is inaccessible from anywhere but the ATM 111. Moreover, the private key of the branch server 116 never leaves the branch server 116 and is inaccessible from anywhere but the branch server 116. Similarly, the private key of the core banking system 130 never leaves the core banking system 130 and is inaccessible from anywhere but the core banking system 130.

Thus, only the public key of the server 116 or the core banking system 130 and a private key of the ATM 111 can be used to decrypt the encrypted whitelist 114. Moreover, the server 116 or the core banking system 130 initially provides the encrypted (and signed) whitelist 114 in the encrypted format and communications between the ATM 111 and the branch server 116 may also use an encrypted communication protocol.

Again, the hash values for the applications 115 are only supplied by the whitelist manager 117 or the whitelist manager 131 to the monitor manager 113 in the form of an encrypted and signed whitelist 114.

The monitor manager 113 is configured to: 1) dynamically decrypt the encrypted whitelist 114 using a private key of the ATM 111; 1) validating a signature for a decrypted version of the encrypted whitelist 114; 3) compute hash values on the executables of the applications 115 before they are initiated for initial processing on the ATM 111; 4) search for identifiers for the applications 115 in the decrypted whitelist; 5) compare the re-computed hash value produced by the monitor manager 113 against the corresponding decrypted whitelist hash values for each of the applications 115; 6) permit those applications 115 that have re-computed hash values that match corresponding hash values from the decrypted version of the encrypted whitelist 114 to execute on the ATM 111 (assuming the digital signature for the decrypted version of the encrypted whitelist 114 was successfully validated); and 7) take one or more configured actions when recomputed hash values do not match with their corresponding hash values from the decrypted version of the encrypted whitelist 114 or when the signature for the decrypted version of the encrypted whitelist 114 was not validated or was invalid.

When there is a discrepancy (item (7) above), the monitor manager 113 can: 1) prevent those applications 115 having discrepancies from executing on the ATM 111; 2) alter processing behavior of other core applications not associated with those applications 115; 3) report the issue to an automated reporting service or maintenance personnel; and/or 4) log the discrepancy on the ATM 111.

If an application 115 is newly added or updated from the ATM 111, the added or updated application 115 is encrypted (using the ATM's private key and a public key of the server 116 or core banking system 130 (for which only the server 116 or core banking system 130 has a corresponding private key to decrypt) and the encrypted added or updated application 115 is sent to the whitelist manager 117 or to the whitelist manager 131 through the branch server 116. An updated encrypted whitelist 114 (with an updated signature) is sent back to the monitor manager 113 and stored as the encrypted whitelist 114 on the ATM 111. In this way, the encrypted whitelist 114 can never be modified on the ATM 111; this helps ensure that it is not tampered with to make a rogue application appear legitimate to the monitor manager 113.

The white list manager 116 or 131 (through the branch server 116) pushes any and all changes to the signature or hash values as an encrypted and signed whitelist 114 to the monitor manager 113. Modifications to the whitelist are only done by the whitelist manager 116 or 131 (passing through the branch server 116). The white list manager 116 or 131 maintains total control of the encrypted whitelist 114. The monitor manager 113 can decrypt using a private key securely held on the ATM 111 to compare against applications 115 that are to be executed on the ATM 111 and the monitor manager 113 can validate the signature of the decrypted whitelist using a public key for the white list managers 117 or 131 once the encrypted whitelist 114 has been decrypted.

The monitor manager 113 may also be configured to check all or some subset of applications 115 executing in memory of the ATM 111 on configured periodic bases after the applications 115 were initially approved by the monitor manager 113 for execution. The monitor manager 113 can also check based on a detection of a preconfigured event. When a hash value obtained from a decrypted version of the encrypted whitelist 114 does not match a hash value for an application 115 that is running, the monitor manager can cause a core application to change its behavior, such as: a reboot of the ATM 111, a termination of the application 115 on the ATM 111, and/or an initiation of a virus scan on the ATM 111.

In this manner, the monitor manager 113 can validate the applications 115 before those applications 115 are initiated on the ATM 111 and can also on a periodic bases and/or on an event-driven bases inspect memory for the executables of the applications 115 running on the ATM 111 to ensure the applications 115 running are not tampered with since initiation on the ATM 111.

Some of embodiments of the FIG. 1 and other embodiments are now discussed with reference to the FIGS. 2-4.

Figure 2:
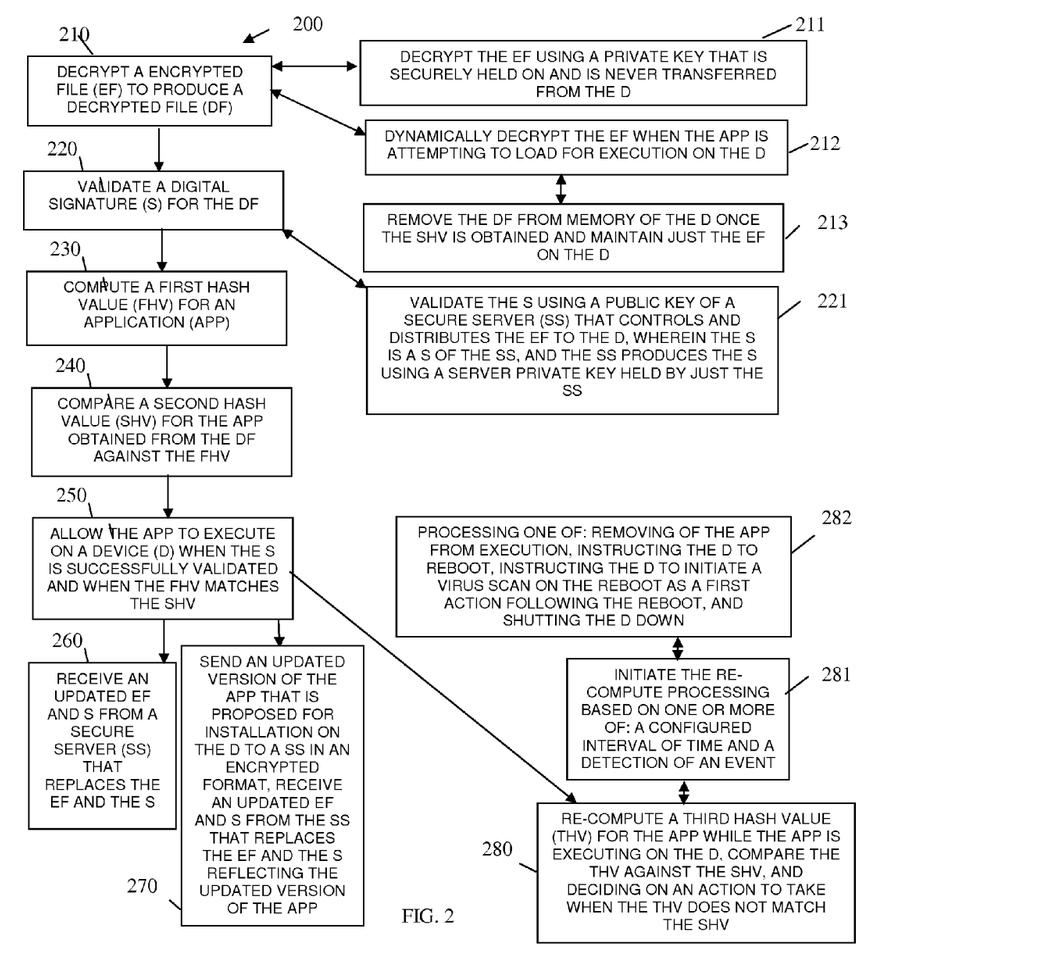
FIG. 2 is a diagram of a method for validating a resource execution, according to an example embodiment.

FIG. 2 is a diagram of a method 200 for validating a resource execution, according to an example embodiment. The software module(s) that implements the method 200 is referred to as a "monitor manager." The monitor manager is implemented as executable instructions programmed and residing within memory and/or a non-transitory computer-readable (processor-readable) storage medium and executed by one or more processors of a device. The processor(s) of the device that executes the monitor manager are specifically configured and programmed to process the monitor manager. The monitor manager has access to one or more network connections during its processing. The network connections can be wired, wireless, or a combination of wired and wireless.

In an embodiment, the device that executes the monitor manager is the ATM 111 of the FIG. 1.

In an embodiment, the device that executes the monitor manager is a Self-Service Terminal (SST). In an embodiment, the SST is a kiosk. In an embodiment, the SST is a self-service checkout station.

In an embodiment, the device that executes the monitor manager is a Point-Of-Sale (POS) terminal. In an embodiment, the POS terminal is operated by a cashier.

In an embodiment, the monitor manager is the monitor manager 113 of the FIG. 1.

At 210, the monitor manager decrypts an encrypted file to produce a decrypted file. The file is a whitelist having application identifiers and computed hash values produced by a secure server. The whitelist was discussed above with reference to the FIG. 1.

In an embodiment, at 211, the monitor manager decrypts the encrypted file using a private key that is securely held on and is never transferred from the device. The device executes the monitor manager and the application, assuming the monitor manager authorizes the application for execution on the device (as discussed below).

According to an embodiment, at 212, the monitor manager dynamically decrypts the encrypted file when the application is attempting to load for execution on the device.

In an embodiment of 212 and at 213, the monitor manager removes the decrypted file from memory of the device once the second hash value (discussed below at 240 and 250) is obtained and the monitor manager maintains just the encrypted file on the device. This limits exposure to the decrypted file on the device.

At 220, the monitor manager validates the digital signature for the decrypted file.

In an embodiment, the monitor manager validates the digital signature using a public key of a secure server that controls and distributes the encrypted file to the device. The digital signature is a digital signature of the secure server and the secure server produces the secure-server digital signature using a server private key held by just the secure server.

At 230, the monitor manager computes a first hash value for an application that is attempting to load on the device for execution. The monitor manager is configured to use a same hash algorithm that the secure server that produced the encrypted file uses.

At 240, the monitor manager compares a second hash value for the application obtained from the decrypted file against the first hash value, which the monitor manager independently produced on the application, which is attempting to execute on the device.

At 250, the monitor manager allows the application to execute on the device when the digital signature for the decrypted file is successfully validated and when the first hash value (produced independently by the monitor manager) matches the second hash value (obtained from the decrypted file).

According to an embodiment, at 260, the monitor manager receives an updated encrypted file and signature from a secure server that replaces the encrypted file and the signature.

In an embodiment, at 270, the monitor manager sends an updated version of the application that is being proposed for installation on the device to a secure server in an encrypted format (using a public key of the secure server). Next, the monitor manager receives an updated encrypted file and signature from the secure server that replaces the original encrypted file and the original signature. The updated encrypted file and signature reflects the updated version of the application.

In an embodiment, at 280, the monitor manager re-computes a third-hash value for the application while the application is executing on the device. The monitor manager compares the third hash value against the second hash value (obtained from the decrypted file), and the monitor manager decides on an action to take when the third hash value does not match the second hash value.

In an embodiment of 280 and at 281, the monitor manager initiates the re-computation to produce the third-hash value based on one or more of: a configured interval of time and detection of a predefined event.

In an embodiment of 281 and at 282, the monitor manager decides on the action to process when the third-hash value does not match the second hash value as one or more of: removing the application from execution on the device, instructing the device to reboot, instructing the device to initiate a virus scan on the reboot as a first action following the reboot, and shutting the device down.

Figure 3:
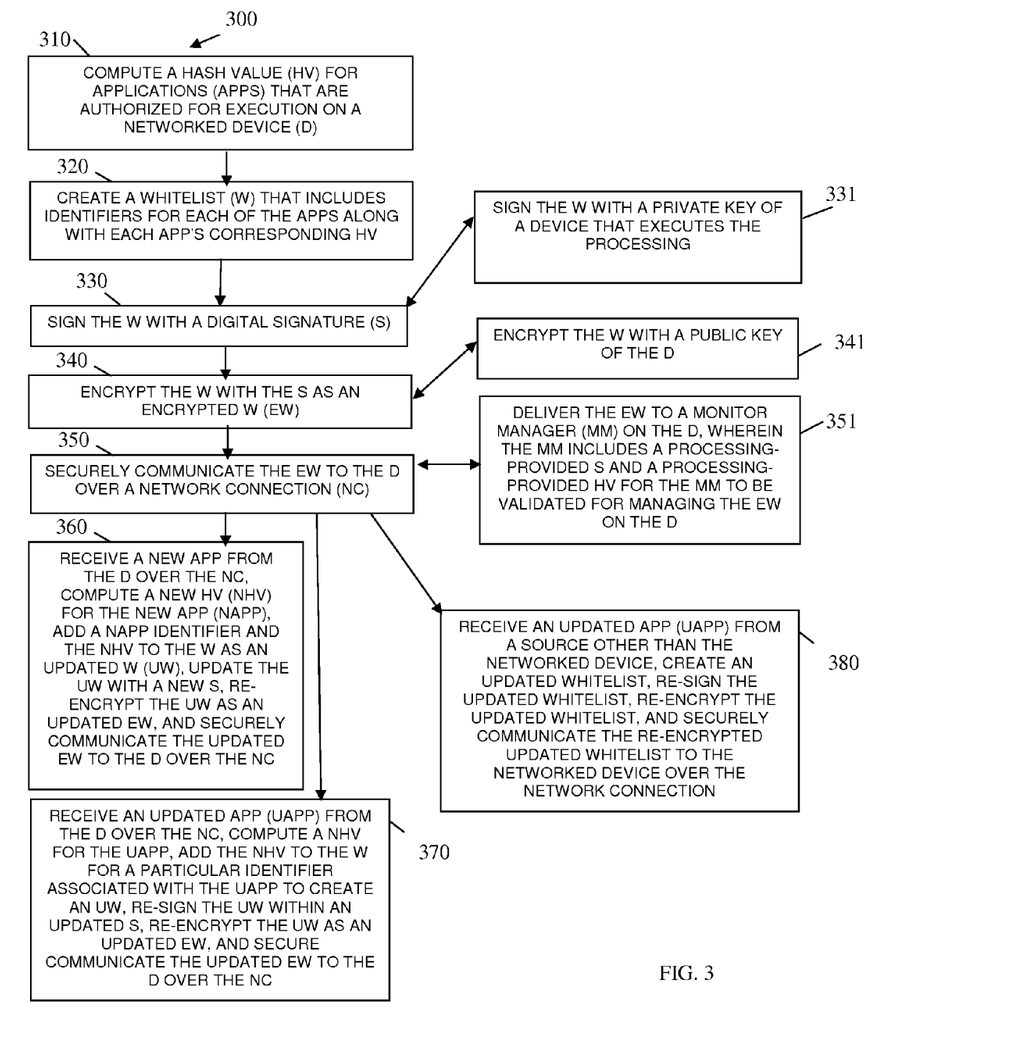
FIG. 3 is a diagram of another method for validating a resource execution, according to an example embodiment.

FIG. 3 is a diagram of another method 300 for validating a resource execution, according to an example embodiment. The software module(s) that implements the method 300 is referred to as a "whitelist manager." The whitelist manager is implemented as executable instructions programmed and residing within memory and/or a non-transitory computer-readable (processor-readable) storage medium and executed by one or more processors of a device. The processors that execute the whitelist manager are specifically configured and programmed to process the whitelist manager. The whitelist manager has access to one or more network connections during its processing. The network connections can be wired, wireless, or a combination of wired and wireless.

In an embodiment, the device that executes the whitelist manager is the branch server 116 of the FIG. 1.

In an embodiment, the device that executes the whitelist manager is the core banking system 130 of the FIG. 1.

In an embodiment, the device that executes the whitelist manager is a secure server.

In an embodiment, the device that executes the whitelist manager is a cloud processing environment.

In an embodiment, the whitelist manager is the whitelist manager 117 of the FIG. 1.

In an embodiment, the whitelist manager is the whitelist manager 131 of the FIG. 1.

The whitelist manager interacts with the whitelist manager represented by the method 200 of the FIG. 2.

At 310, the whitelist manager computes a hash value for applications that are authorized for execution on a networked device. Each application includes its own unique hash value.

At 320, the whitelist manager creates a whitelist that includes identifiers for each of the applications along with each application's corresponding unique hash value.

At 330, the whitelist manager signs the whitelist with a digital signature.

According to an embodiment, at 331, the whitelist manager signs the white list with a private key of a device that executes the whitelist manager; a device, such as a secure server.

At 340, the whitelist manager encrypts the whitelist with the signature as an encrypted whitelist.

In an embodiment, at 341, the whitelist manager encrypts the whitelist with a public key of the networked device (recipient of the encrypted whitelist).

At 350, the whitelist manager securely communicates the encrypted whitelist to the networked device over a network connection.

According to an embodiment, at 351, the whitelist manager delivers the encrypted whitelist to a monitor manager on the networked device. The monitor manager includes a whitelist manager-provided digital signature and a whitelist manager-provided hash value for the monitor manager to be validated for execution on the networked device and for managing the delivered encrypted whitelist to the networked device.

According to an embodiment, at 360, the whitelist manager receives a new application from the networked device over the network connection. Next, the whitelist manager computes a new hash value for the new application and adds a new application identifier and the new hash value to the whitelist as an updated whitelist. The whitelist manager then updates the updated whitelist with an updated digital signature and re-encrypts the updated whitelist. Finally, the whitelist manager securely communicates the updated encrypted whitelist to the networked device over the network connection.

In an embodiment, at 370, the whitelist manager receives an updated application from the device over the network connection in an encrypted format. The whitelist manager decrypts the encrypted format and computes a new hash value for the updated application. Next, the whitelist manager adds the new hash value to the whitelist for a particular identifier associated with the updated application to create an updated whitelist. The whitelist manager re-signs the updated whitelist with an updated signature and securely communicates the updated encrypted whitelist to the networked device over the network connection.

In an embodiment, at 380, the whitelist manager receives an update to one or more applications from a source other than the networked device. In response thereto, the whitelist manager creates an updated whitelist, resigns the updated whitelist, re-encrypts the updated whitelist, and securely communicates the re-encrypted updated whitelist to the networked device over the network connection.

Figure 4:
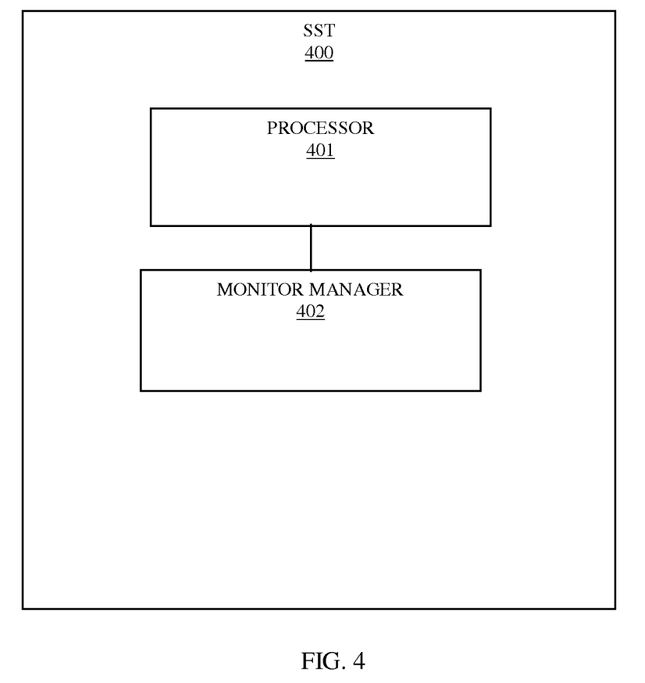
FIG. 4 is a diagram of a Self-Service Terminal, according to an example embodiment.

FIG. 4 is a diagram of a SST 400, according to an example embodiment. The SST 400 includes a variety of hard ware components and software components. The software components of the SST 400 are programmed and reside within memory and/or a non-transitory computer-readable medium and execute on one or more processors of the SST 400. The SST 400 communicates over one or more networks, which can be wired, wireless, or a combination of wired and wireless.

In an embodiment, the SST 400 is the ATM 111 of the FIG. 1.

In an embodiment, the SST 400 is a kiosk.

In an embodiment, the SST 400 is a POS terminal.

The SST 400 includes a processor 401 and a monitor manager 402.

The monitor manager 402 is adapted and configured to: execute on the processor 401, maintain an encrypted whitelist having application identifiers for applications with each application identifier associated with an application hash value produced by a server, compute new hash values when the applications are attempting to execute on the SST 400, and permit those applications that have corresponding new hash values that match entries in decrypted version of the whitelist to execute on the SST 400.

In an embodiment, the monitor manager 402 is further configured to validate a digital signature of the server included in the decrypted version of the whitelist before using the hash values obtained from the decrypted version of the whitelist.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
    decrypting an encrypted file to produce a decrypted file;
    validating a digital signature for the decrypted file;
    computing a first hash value for an application;
    comparing a second hash value for the application obtained from the decrypted file against the first hash value;
    allowing the application to execute on a device when the digital signature is successfully validated and when the first hash value matches the second hash value; and
    instructing a device processing the method to: remove the application from the device, reboot the device, initiate a virus scan on a reboot of the device as a first action following the reboot, and shut down the device to initiate the reboot when the digital signature is unsuccessfully validated and when the first hash value does not match the second hash value; and
    re-computing a third hash value for the application while the application is executing on the device, comparing the third hash value against the second hash value, and deciding on an action to take when the third hash value does not match the second hash value;
    wherein the method is instantiated on the device for execution on the device when an Operating System (OS) on a boot of the device validates a method hash value for the method and a method digital signature for the method based on a stored encrypted method hash value on the device and a private key of the device, and wherein the method is an OS driver of the OS.

2. The method of claim 1 further comprising, receiving an updated encrypted file and signature from a secure server that replaces the encrypted file and the signature.

3. The method of claim 1 further comprising, sending an updated version of the application that is proposed for installation on the device to a secure server in an encrypted format, and receiving an updated encrypted file and signature from the secure server that replaces the encrypted file and the signature reflecting the updated version of the application.

4. The method of claim 1 further comprising, validating a method signature and a computed method hash value for the method processing against an expected signature and an expected hash value before initiating the method on the device for processing.

5. The method of claim 1, wherein re-computing further includes initiating the re-computing based on one or more of: a configured interval of time and a detection of an event.

6. The method of claim 1, wherein decrypting further includes decrypting the encrypted file using the private key that is securely held on and is never transferred from the device.

7. The method of claim 1, wherein decrypting further includes dynamically decrypting the encrypted file when the application is attempting to load for execution on the device.

8. The method of claim 7, wherein dynamically decrypting further includes removing the decrypted file from memory of the device once the second hash value is obtained and maintaining just the encrypted file on the device.

9. The method of claim 1, wherein validating further includes validating the digital signature using a public key of a secure server that controls and distributes the encrypted file to the device, wherein the digital signature is a digital signature of the secure server, and the secure server produces the secure server digital signature using a server private key held by just the secure server.

10. A method, comprising:
computing a hash value for each of a plurality of applications that are authorized for execution on a networked device;
creating a whitelist that includes identifiers for each of the applications along with each application's corresponding hash value;
signing the whitelist with a digital signature
encrypting the whitelist with the digital signature as an encrypted whitelist; and
securely communicating the encrypted whitelist to the networked device over a network connection, wherein the encrypted whitelist can only be decrypted with a private key of the networked device and a public key of a device that executes the method, and wherein the networked device processes an Operating System (OS) driver during boot of the networked device and the OS driver is validated for execution on the networked device during boot with an encrypted hash value stored on the networked device and decrypted at least with the private key of the networked device and the public key of the device that executes the method; and
instructing the networked device to: re-compute new hash values for the applications during execution of the applications on the network device and compare the new hash values against the hash values, remove a particular application when that particular application is unsuccessfully validated by the networked device from the networked device, reboot the network device when any of the applications are invalidated by the network device, initiate a reboot a virus scan as a first action following the reboot, and shut down the device to initiate the reboot when the particular application that is processing on the networked device or the OS driver are unsuccessfully validated by the networked device.

11. The method of claim 10 further comprising, receiving a new application from the networked device over the network connection, computing a new application hash value for the new application, adding a new application identifier and the new application hash value to the whitelist as an updated whitelist, updating the updated whitelist with a new digital signature; re-encrypting the updated whitelist as an updated encrypted whitelist, and securely communicating the updated encrypted whitelist to the networked device over the network connection.

12. The method of claim 10 further comprising, receiving an updated application from the networked device over the network connection, computing a new application hash value for the updated application, adding the new application hash value to the whitelist for a particular identifier associated with the updated application to create an updated whitelist, re-signing the updated whitelist with an updated digital signature, re-encrypting the updated whitelist as an updated encrypted whitelist, and securely communicating the updated encrypted whitelist to the networked device over the network connection.

13. The method of claim 10 further comprising, receiving an update to one or more of the applications from a source other than the networked device, creating an updated whitelist, re-signing the updated whitelist with an updated digital signature; re-encrypting the updated whitelist, and securely communicating the re-encrypted updated whitelist to the networked device over the network connection.

14. The method of claim 10, wherein signing further includes signing the whitelist with a private key of the device that executes the method.

15. The method of claim 10, wherein encrypting further includes encrypting the whitelist with a public key of the networked device.

16. The method of claim 10, wherein securely communicating further includes delivering the encrypted whitelist to a monitor manager on the networked device, wherein the monitor manager includes a method-provided digital signature and a method-provided hash value for the monitor manager to be validated for managing the encrypted whitelist on the networked device.

17. A Self-Service Terminal (SST), comprising:
a processor; and
a monitor manager configured to: i) execute on the processor, ii) maintain an encrypted whitelist having application identifiers for applications with each application identifier associated with an application hash value produced by a server, iii) compute new hash values when the applications are attempting to execute on the SST, and iv) permit those applications that have corresponding new hash values that match entries in decrypted version of the whitelist to execute on the SST, wherein an Operating System (OS) associated with the processor validates and initiates the monitor manager as an OS driver on the SST during a boot of the SST by validating a monitor manager hash value and a monitor manager digital signature against an encrypted hash value stored for the OS driver on the SST and using a private key of the SST, and instruct the SST to: continuously compute the new hash values during execution of the applications on the SST and compare the new hash values against the application hash values, remove a particular application that is unsuccessfully validated on the SST from the SST, reboot the SST, initiate a virus scan on a reboot of the SST as a first action following the reboot, and shut down the SST to initiate the reboot when the particular application or the monitor manager hash value and the monitor manager digital signature are unsuccessfully validated on the SST.

18. The SST of claim 17, wherein the monitor manager is further configured to: v) validate a digital signature of the server included in the decrypted version of the whitelist before using the hash values obtained from the decrypted version of the whitelist.

\* \* \* \* \*